US 6,657,172 B2

(12) United States Patent
Yamauchi et al.

(10) Patent No.: US 6,657,172 B2
(45) Date of Patent: Dec. 2, 2003

(54) HIGH FREQUENCY HEATING APPARATUS EQUIPPED WITH OVEN HOOD

(75) Inventors: Masato Yamauchi, Kyoto (JP); Toshiyuki Ishiguro, Nara (JP); Hirofumi Yoshimura, Nara (JP); Fumihiko Migaki, Nara (JP); Ikuhiro Inada, Yamatokooriyama (JP); Masato Matsuda, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/196,963

(22) Filed: Jul. 17, 2002

(65) Prior Publication Data

US 2003/0015525 A1 Jan. 23, 2003

(30) Foreign Application Priority Data

Jul. 18, 2001 (JP) .................................... P.2001-217777
Sep. 11, 2001 (JP) .................................... P.2001-274616

(51) Int. Cl.$^7$ ............................. H05B 6/68; H05B 6/80
(52) U.S. Cl. ..................... 219/757; 219/758; 219/702; 219/715; 219/719; 126/299 R
(58) Field of Search ................................ 219/757, 758, 219/702, 715, 716, 717, 721, 719; 126/299 R, 299 D

(56) References Cited

U.S. PATENT DOCUMENTS 4,967,051 A * 10/1990 Maehara et al. ............ 219/716
6,104,016 A * 8/2000 Lee ............................. 219/702
6,222,171 B1 * 4/2001 Fukuda et al. .............. 219/757
6,396,038 B1 * 5/2002 Lee et al. .................... 219/757

FOREIGN PATENT DOCUMENTS

JP 2-227988 * 9/1990

* cited by examiner

Primary Examiner—Philip H. Leung
(74) Attorney, Agent, or Firm—Pearne & Gordon LLP

(57) ABSTRACT

A high frequency heating apparatus equipped with the oven hood comprises a heating chamber, a power supply apparatus for controlling high frequency output power by way of a semiconductor element, ventilation, and illumination for illuminating an object to be heated by another heat-cooking apparatus. Since the high frequency output power is controlled in such a manner that an optimum heating output power is applied in a linear manner for a proper time period, the heating output power can be controlled in the linear manner and the high frequency heating apparatus can be largely reduced in weight. As a result, the highest-speed heat-cooking operation by receiving the maximum high frequency output power can be realized, and the optimum cooking performance can be realized. Both the installation performance of the appliance to the mounting wall plane and the safety performance achieved by stably fixing the appliance can also be largely improved.

7 Claims, 16 Drawing Sheets

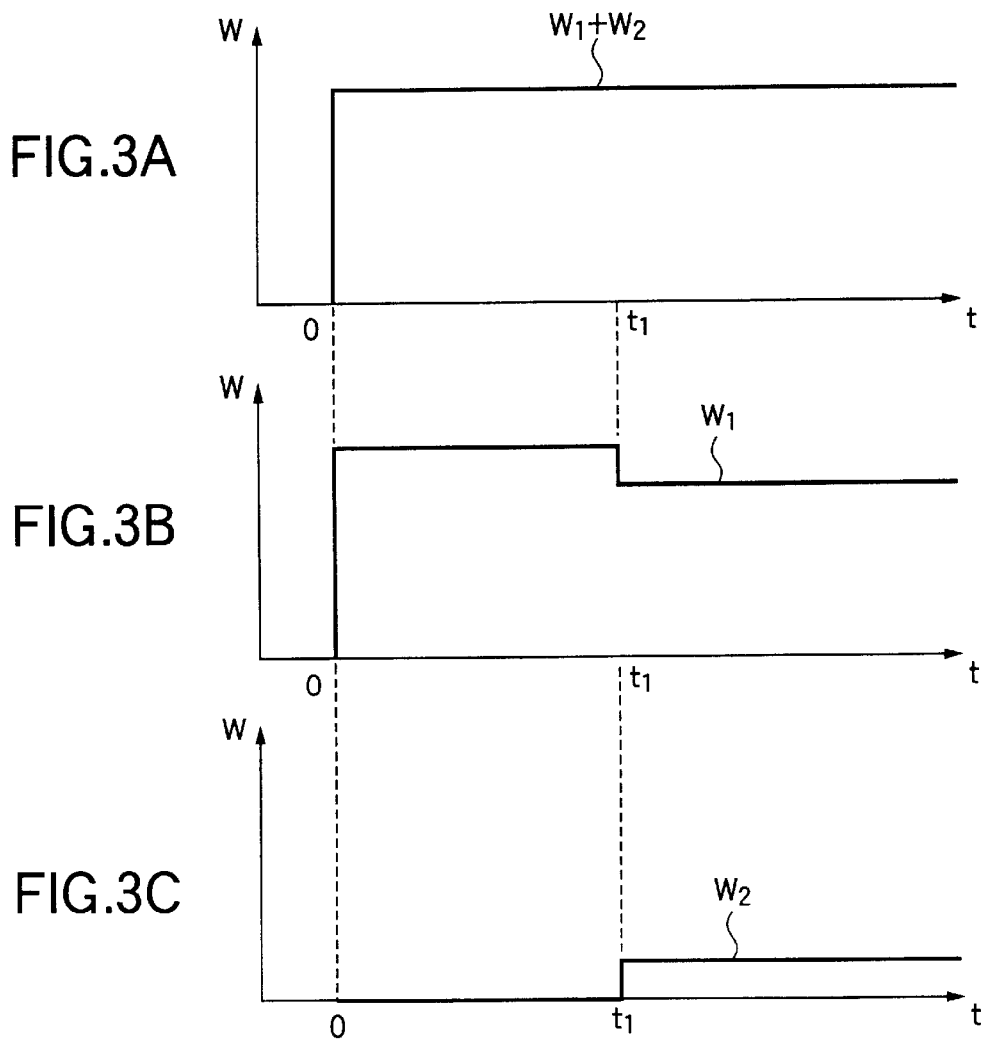

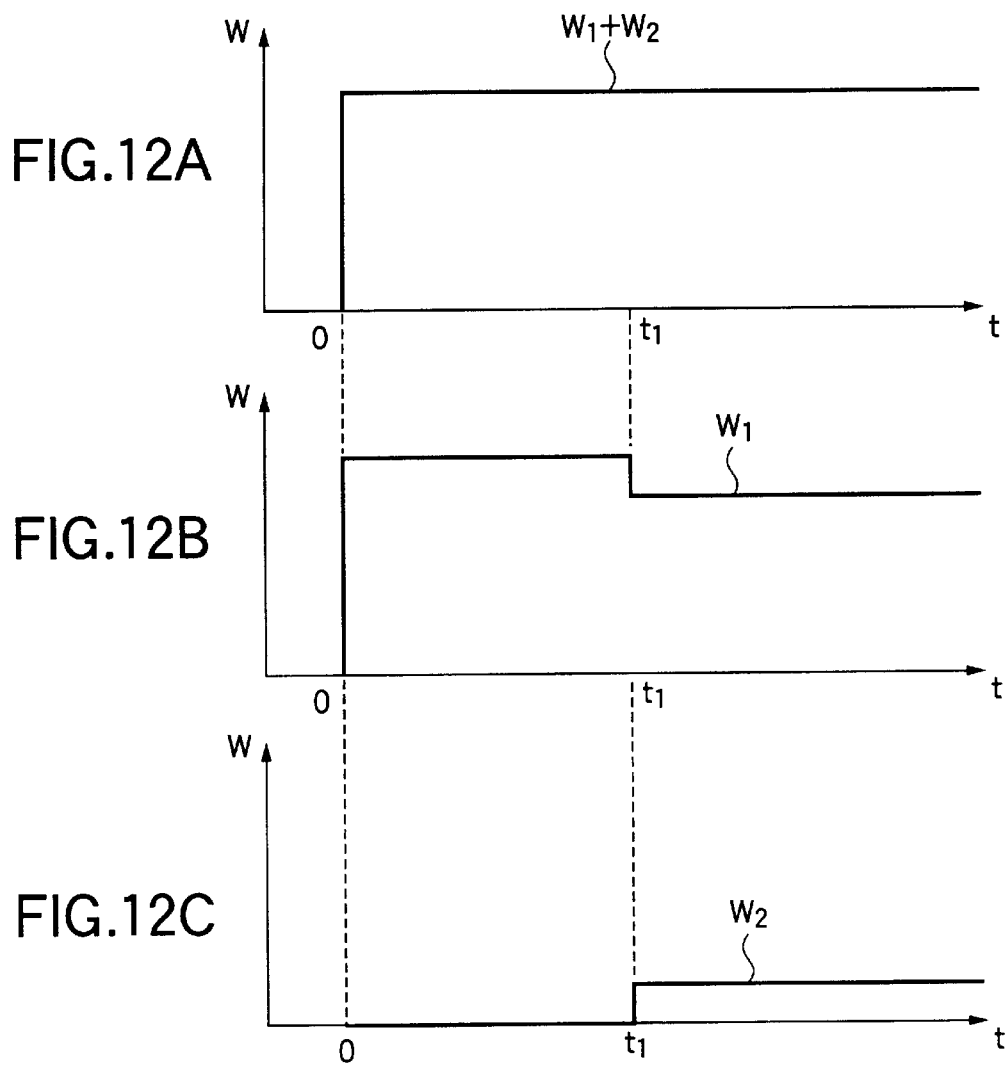

HIGH FREQUENCY HEATING APPARATUS EQUIPPED WITH OVEN HOOD

BACKGROUND OF THE INVENTION

1. Field of the Invention

The present invention is related to a high frequency heating apparatus equipped with an oven hood, which owns a function capable of ventilating gas generated from another heat-cooking apparatus installed under a main body of the own high frequency heating apparatus, and is arranged to convert electric power into high frequency electric power with employment of a semiconductor element.

2. Description of the Related Art

Conventionally, as this sort of appliance, such a high frequency heating apparatus having a construction capable of converting electric power into high frequency electric power with employment of a semiconductor element has not yet been proposed. However, there is merely provided a heating appliance having a ventilation means and an arrangement for supplying high frequency electric power by way of an LC resonant circuit constituted by a heavy weight object. FIG. 7 represents an appliance having the conventional arrangement.

In FIG. 7, reference numeral 1 shows a heating chamber for storing thereinto an object to be heated, reference numeral 2 represents a power supply apparatus having an LC resonant circuit arrangement which heats the object to be heated, and reference numeral 3 shows a ventilation means for ventilating gas generated from another heat-cooking apparatus installed under a main body of the conventional appliance. Also, reference numeral 4 indicates an illumination means for illuminating the above-described another heat-cooking apparatus by using light, which is installed under the main body of this conventional appliance.

Additionally, in microwave ovens corresponding to high frequency heating apparatus, various technical ideas have be taken in order to shorten heating time. For instance, as described in Japanese Laid-open Unexamined Patent Publication No. Hei-2-227988, while peripheral temperatures of the respective elements such as a magnetron are detected, since maximum output power higher than the normal continuous maximum output power is generated for a time period until the detected temperatures reach the safety limiting temperatures of the respective elements, such a technical idea is made that the heating time is shortened while the safety characteristics of the respective elements are secured.

However, in usual homes, these microwave ovens are normally used under the power supply having the rated power of 100V/15A due to the Japanese indoor electric wiring system, so that power consumption of these microwave ovens should be suppressed lower than, or equal to 1.5 KW.

Referring now to FIGS. 16A, 16B, and 16C, power consumption of a microwave oven which constitutes a conventional general-purpose high frequency heating apparatus will be explained.

In FIGS. 16A, 16B, and 16C, an abscissa shows time "t", and an ordinate indicates power consumption "W". FIG. 16A shows an overall power consumption of the microwave oven. Similarly, FIG. 16B indicates electric power "W1" which is consumed so as to oscillate electromagnetic waves from a magnetron corresponding to an electromagnetic wave radiation unit employed in the microwave oven. FIG. 16C indicates other power consumption, namely power consumption "2W" of a cooling means (for example, fan), an illumination means (lamp), and a food mounting means (turn table). Although the power consumption "W2" shown in FIG. 16C is substantially constant irrespective of a time elapse, the electric power W1 which is consumed so as to oscillate the electromagnetic waves and is represented in FIG. 16B is slightly changed, depending upon temperatures of the magnetron and the control method. In this case, this power consumption W1 is slightly decreased from a stating time "0" of the heating operation up to time "t6", and then, becomes constant after this time "t6". Since FIG. 16A is the entire power consumption of the microwave oven, this power consumption becomes "W1+W2". Now, in such a case that general-purpose microwave ovens are employed, these microwave ovens are usually used under the power supply having the rated power of 100V/15A. Thus, the power consumption of these microwave ovens is suppressed lower than, or equal to 1.5 KW. Within this power consumption of 1.5 KW, electric power of the fan (10 W), the lamp (30 W), and the turn table (10 W) is consumed other than the oscillation of the electromagnetic waves. Furthermore, as to the oscillation of the electromagnetic waves, since the actual power consumption is changed into the electromagnetic waves at an efficiency of approximately 50 to 60%, high frequency output power defined from 500 W to 700 W are mainly used so as to heat foods.

However, since the high frequency electric power cannot be controlled in a linear manner in the above-explained conventional appliance as shown FIG. 7, this appliance is designed by that a total value of maximum rated electric power of the respective electric components does not exceed an upper limit value which is determined with respect to entire power consumption of this conventional appliance.

In other words, even when the ventilation means and/or the illumination means are not operated, the total power consumption thereof is not added to the high frequency electric power used to heat the object to be heated. Also, since the power control operation performed when the heat cooking operation is carried out is realized by interrupting constant high frequency output power, the proper high frequency output power cannot be supplied in response to heating conditions of the object to be heated during the cooking operation, which may cause fluctuations in cooking performance to be extended. Furthermore, the LC power supply is a heavy weight object having a weight of approximately 10 KG including a high voltage transformer and a high voltage capacitor. Moreover, in the case that this heavy-weight appliance whose gravity center is considerably deviated qn the side of the electric chamber is installed, installation works thereof are necessarily required by conducting a plurality of workers. Therefore, there is a problem as to a safety characteristic with respect to such an aspect that after the heavy-weight appliance whose gravity center is deviated is installed, since a strength of a wall plane is not sufficiently large, such a heavy weight appliance is not fixed under stable condition.

Futhermore, in the above-explained conventional arrangement, since the power consumption used other than the oscillation of the electromagnetic waves is continuously constant after the heating operation is commenced, there is an upper limit in electric power which is used to oscillate the electromagnetic waves. Therefore, there is a problem that the heating time cannot be shortened.

Also, inversely in order secure a large amount of electric power so as to oscillate the electromagnetic waves, if the cooling means such as the fan is eliminated, then another problem will occur. Namely, reliability of the microwave oven is deteriorated, for instance, the break down of the electromagnetic wave radiation unit such as the magnetron occurs due to the temperature increase. Also, if the illumination means such as the lamp is eliminated, then there is another problem that the progressive degrees of the heating operation cannot be observed outside this microwave oven. When the food mounting means such as the turn table is eliminated, the food cannot be uniformly heated. As a result, there is another problem that the quality of the cooking result is fluctuated.

SUMMARY OF THE INVENTION

The present invention has been made to solve the above-described problems of the prior art, and therefore, has an object to provide a high frequency heating apparatus capable of deriving maximum high frequency electric power from a limited power consumption regulating value, capable of deriving cooking performance in maximum, and also capable of largely improving an installation workability of an appliance and a safety characteristic of fixing the appliance after the installation, while providing cooking performance, and either installation performance or safety performance of the appliance, which can be satisfied by customers.

Furthermore, the present invention has been made to solve the above-explained problems, and therefore, has an object to realize a high frequency heating apparatus capable of confirming a progressive degree of heating food, and capable of uniformly heating the food, while heating time is shortened and break down of a magnetron and the like due to a temperature increase does not occur.

To solve the above-described problems of the prior art, a high frequency heating apparatus equipped with a high frequency power control means made of a semiconductor element and an oven hood function, according to the present invention, is arranged to be controlled in such a manner that maximum high frequency electric power can be conducted within an upper limit value of power consumption; high frequency output power can be increased/decreased in a linear manner, if required; and a weight of an appliance can be largely reduced.

As a consequence, highest-speed heat-cooking operation by outputting the maximum high frequency power can be realized, the cooking sequence capable of conducting the optimum cooking performance can be realized, and the installation performance and safety performance of the appliance with respect to the appliance mounting wall plane can be largely improved.

To solve the above-described problems of the prior art, a high frequency heating apparatus equipped with a high frequency power control means made of a semiconductor element and an oven hood function, according to the present invention, is arranged to be controlled in such a manner that maximum high frequency electric power is conducted within an upper limit value of power consumption; high frequency output power is increased/decreased in a linear manner, if required; and also, any one of operations as to a cooling means, an illumination means, a food mounting means, and a ventilation means is stopped, or is carried out under low power when the maximum higher frequency power is outputted.

As a consequence, highest-speed heat-cooking operation by outputting the maximum high frequency power can be realized, the cooking sequence capable of conducting the optimum cooking performance can be realized, and the high frequency output power can be effectively supplied.

A high frequency heating apparatus of the present invention, is featured by that a supply of electric power by a high frequency heating apparatus equipped with an oven hood is carried out by a high frequency power control means constituted by a semiconductor element. As a result, a weight of a power supply apparatus having a large weight ratio can be largely reduced. As indicated in FIG. 8, this high frequency heating apparatus can be easily installed even on a high-place mounting wall plane located above another heat-cooking apparatus, as shown in FIG. 8 in which the high frequency heating apparatus can be hardly installed. In addition, since the weight balance is better, the appliance can be fixed under stable condition, so that safety characteristics thereof can be largely improved.

The invention is featured by that while the power supply apparatus of the high frequency heating apparatus equipped with the oven hood, is realized by a high frequency power control means made of a semiconductor element, since a time limiting element is provided with this power control means, the linear heating output power which is required to cook the object to be heated can be supplied for a necessary time duration, so that optimum cooking performance can be realized.

As represented in FIG. 9 where the effects of the present invention are compared with those of the prior art, the invention is featured by that the supply of the electric power of the high frequency heating apparatus equipped with the oven hood is realized by a high frequency power control means made of a semiconductor element. As a result, since the maximum high frequency electric power can be derived within the range where this maximum high frequency electric power does not exceed the upper limit value of the power consumption as the entire appliance, such electric power control operations can be carried out. That is, when the operations of the ventilation means and the illumination means are stopped, the high frequency heating power up to the upper limit value can be derived. Conversely, when the operations of the ventilation means and the illumination means are carried out, the high frequency heating power can be maintained within the upper limit value of the power consumption of the entire appliance. Thus, the maximum allowable heating power can be controlled within the range where this maximum allowable heating power does not exceed the upper limit value of the power consumption as the entire appliance, if required.

Also, in order to prevent an overheat break down phenomenon of the semiconductor element provided within the heating apparatus whose self-heating amount is the highest value, a temperature of cooling wind thereof is sensed. As a result, the high frequency output power is controlled before such a problem happens to occur, so that break down phenomena of the components, smoking of these components, and firing of these components may also be prevented.

The invention is featured by that while the power supply apparatus of the high frequency heating apparatus equipped with the oven hood, is realized by a high frequency power control means made of a semiconductor element, maximum high frequency output power higher than the normal high frequency output power is supplied for a constant time period after a supply of electric power is commenced. As a consequence, at a time instant where the self-heating amount of the power supply apparatus is low when the power heating operation is commenced, a heat efficiency can be effectively utilized in a maximum value, and the heating power can be supplied. More specifically, while the use frequency becomes maximum and also the large effect may be achieved, the large time reduction of the light load heat-cooking operation can be realized.

The invention is featured by that while the power supply apparatus of the high frequency heating apparatus equipped with the oven hood, is realized by a high frequency power control means made of a semiconductor element, the maximum high frequency output power is supplied for a constant time period after the heating operation is commenced. As a result, in particular, while the use frequency becomes maximum and also the large effect may be achieved, the large time reduction of the light load heat-cooking operation can be realized.

A high frequency heating apparatus, of the present invention, is featured by such a high frequency heating apparatus equipped with an oven hood, comprising: a heating chamber for entering thereinto/deriving therefrom an object to be heated such as food, an electromagnetic wave radiation unit for radiating electromagnetic waves into the heating chamber; cooling means for cooling the electromagnetic wave radiation unit; first illumination means for illuminating light into the heating chamber; second illumination means for illuminating another heat-cooking apparatus by light, which is installed under a main body of an appliance; food mounting means for mounting thereon the food within the heating chamber and being operated in rotation motion; ventilation means for ventilating gas generated from the another heat-cooking apparatus, which is taken from an air suction portion; and control means for controlling the electromagnetic wave radiation unit, the cooling means, the first and second illumination means, and the food mounting means; wherein: high frequency output power of the electromagnetic wave radiation unit is switched in plural output stages, and when maximum high frequency output power is outputted, any one of operations as to the first and second illumination means, and the food mounting means is stopped, or is carried out under low power. As a result, since the maximum high frequency electric power can be derived within the range where this maximum high frequency electric power does not exceed the upper limit value of the power consumption as the entire appliance, such electric power control operations can be carried out. That is, when the operations of the ventilation means and the illumination means are stopped, the high frequency heating power up to the upper limit value can be derived. Conversely, when the operations of the ventilation means and the illumination means are carried out, the high frequency heating power can be maintained within the upper limit value of the power consumption of the entire appliance. Thus, the maximum allowable heating power can be controlled within the range where this maximum allowable heating power does not exceed the upper limit value of the power consumption as the entire appliance, if required.

A high frequency heating apparatus of the present invention, is featured by that the high frequency heating apparatus is constituted to supply the maximum high frequency output power for a constant time period after the heating operation is commenced. As a consequence, at the time instant where the self-heating amount of the power supply apparatus is low when the power heating operation is commenced, the heat efficiency can be effectively utilized in the maximum value, and the heating power can be supplied. More specifically, while the use frequency becomes maximum and also the large effect may be achieved, the large time reduction of the light load heat-cooking operation can be realized.

A high frequency heating apparatus is featured by that the high frequency heating apparatus is further comprised of: temperature sensing means for sensing a temperature of the electromagnetic wave radiation unit; and the high frequency heating apparatus is constituted by supplying the maximum high frequency output power while the sensed temperature of the electromagnetic wave radiation unit is lower than, or equal to a certain temperature. As a result, since the high frequency power is lowered and the operation of the cooling fan is commenced, the increase in the temperature can be stopped. As a consequence, there is such an effect that the high frequency output power can be effectively supplied in accordance with the reliability of the magnetron.

A high frequency heating apparatus of the present invention, is featured by that the high frequency heating apparatus is further comprised of: detection means for detecting a physical amount (weight, shape, temperature, dielectric constant etc.) of the food, and also for detecting a condition (temperature, humidity, electric field etc.) of the heating chamber; and the high frequency heating apparatus is arranged to supply the maximum high frequency output power in response to a detection output of the detection means. As a consequence, at the time instant where the self-heating amount of the power supply apparatus is low when the power heating operation is commenced, the heat efficiency can be effectively utilized in the maximum value, and the heating power can be supplied. More specifically, while the use frequency becomes maximum and also the large effect may be achieved, the large time reduction of the light load heat-cooking operation can be realized.

BRIEF DESCRIPTION OF THE DRAWINGS

FIG. 3A is a characteristic diagram for showing entire power consumption of the high frequency heating apparatus according to the embodiment 1 of the present invention, FIG. 3B is a characteristic diagram for indicating power consumption used to oscillate electromagnetic waves in the embodiment 1 of the present invention, and FIG. 3C is a characteristic diagram for denoting power consumption used other than the oscillation of the electromagnetic waves in the embodiment 1 of the present invention, FIG. 12A is a characteristic diagram for showing entire power consumption of the high frequency heating apparatus according to the embodiment 5 of the present invention, FIG. 12B is a characteristic diagram for indicating power consumption used to oscillate electromagnetic waves in the embodiment 5 of the present invention, and FIG. 12C is a characteristic diagram for denoting power consumption used other than the oscillation of the electromagnetic waves in the embodiment 5 of the present invention.

Figure 1:
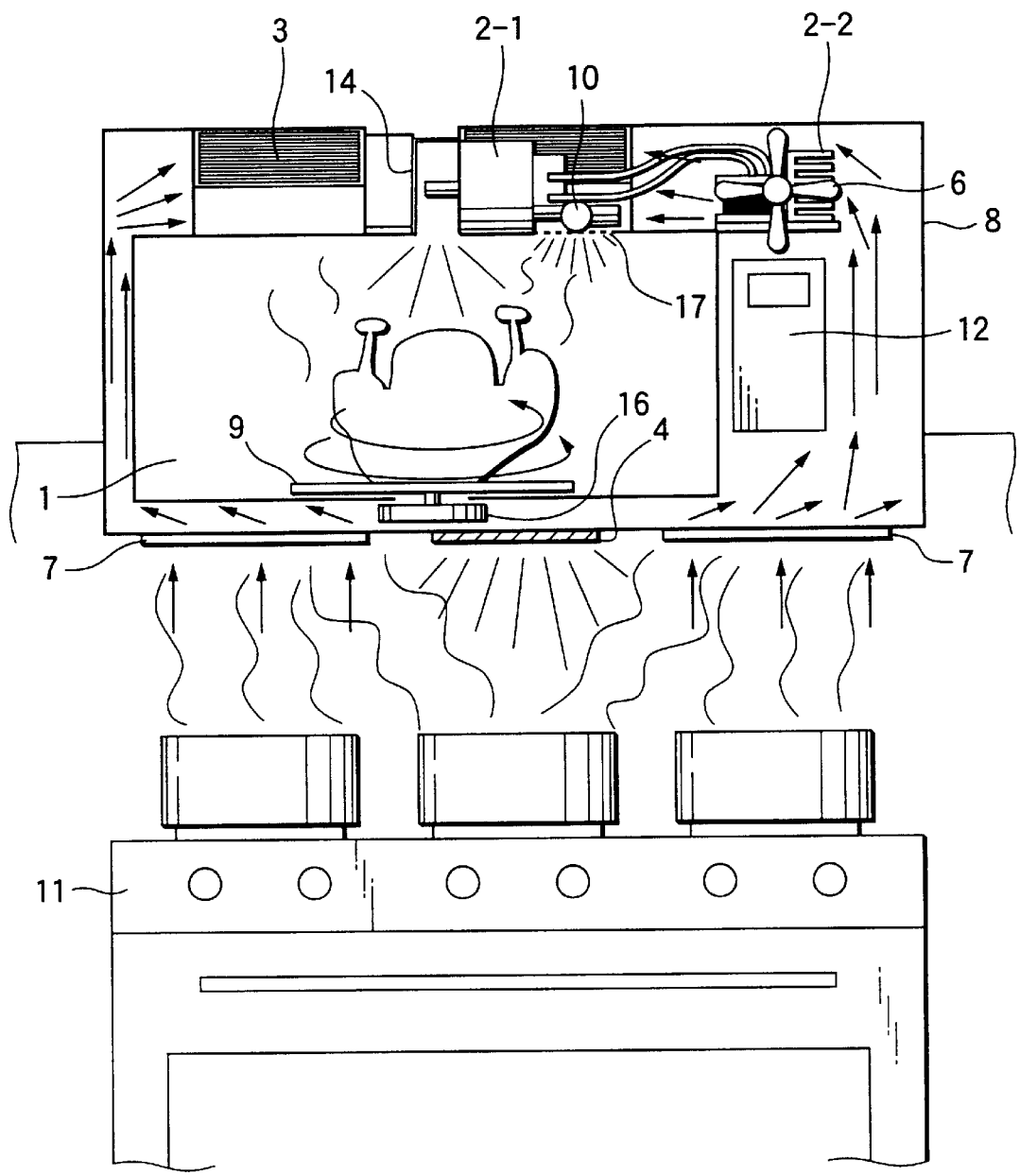
FIG. 1 is an installation diagram for indicating a high frequency heating apparatus equipped with an oven hood according to an embodiment 1 of the present invention.

In the drawings, the reference numerals are referring to as follows:

1—heating chamber;
2—power supply apparatus;
2-1—high frequency heating apparatus;
2-2—power converter having semiconductor element;
3—ventilation means;
4—first illumination means;
6—cooling means;
7—air suction port;
8—main body of appliance;
9—rotation means of high frequency heating object;
10—second illumination means;
11—another high frequency heating object;
12—control unit (control means);
14—waveguide;
16—drive unit of rotation means;
17—indoor illuminating hole;
201—heating chamber;
202—food;
203—magnetron (electromagnetic wave radiation unit);
206—turn table (food mounting means);
208—cooling fan (cooling means);
209—lamp (second illumination means);
212—control unit (control means);
251—ventilation means; and
252—lamp (first illumination means).

DETAILED DESCRIPTION OF THE PREFERRED EMBODIMENT(S)

Referring now to drawings, embodiments of the present invention will be described.

(Embodiment 1)

FIG. 1 is a diagram for illustratively indicating functions of respective components and an arranging structure of a high frequency heating apparatus equipped with an oven hood, according to an embodiment 1 of the present invention.

Figure 2:
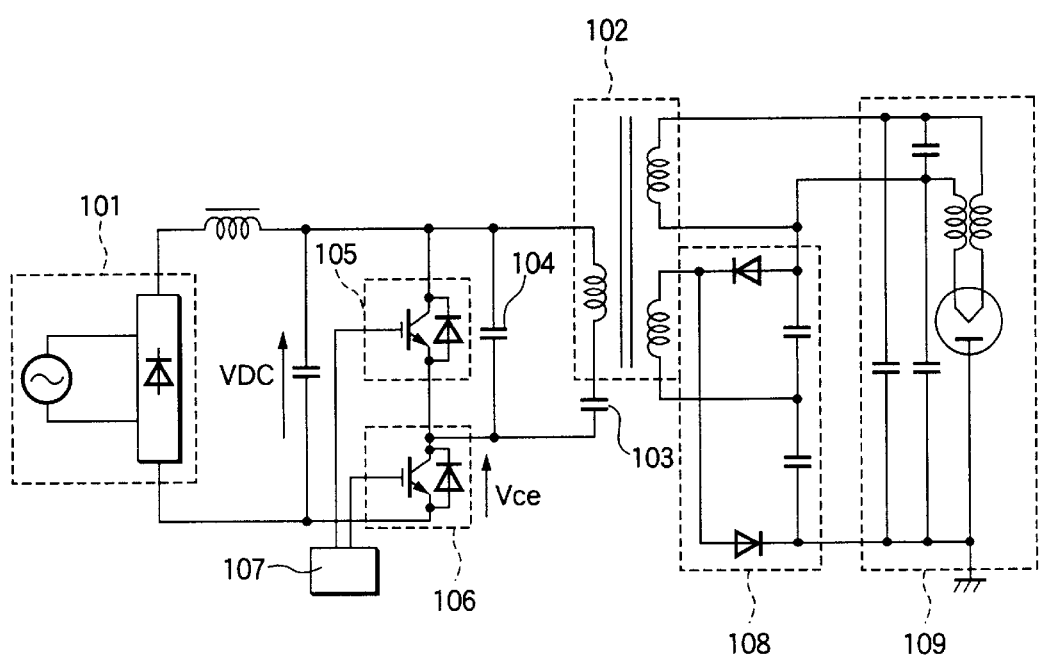
FIG. 2 is a circuit diagram of a power converter employed in the embodiment 1 of the present invention.

In FIG. 2, a power supply apparatus 2 is arranged by employing a semiconductor element so as to control high frequency electric power, and both a high frequency generating apparatus (magnetron) 2-1 and a power converter 2-2 using a semiconductor element constitute a heating means. A ventilation means 3 has such a structure that gas generated by a cooking operation by using another heat-cooking apparatus 11 which is positioned under the appliance is taken into the inside of the appliance from an air suction port 7 formed in a bottom plane portion of the appliance, and then, is exhausted via the ventilation means 3 to either a front plane of an upper portion of the appliance or to an outdoor area.

Normally, a ventilation means owns such a technical specification. That is, the ventilation means may be independently operated irrespective of high frequency heat-cooking operation, or may be automatically operated to perform ventilation by sensing hot air, depending upon a cooking degree of another heat-cooking operation located under this appliance.

A first illumination means 4 corresponds to an illumination means for illuminating an object to be heated by light, which is cooked by another heat-cooking apparatus located under the appliance. Normally, this first illumination means 4 is located at a bottom plane of the appliance.

Also, a high frequency control means made of a semiconductor element is operated in such a manner that an AC voltage of a commercial power supply is rectified by a rectifier so as to be converted into a DC voltage, and then, high frequency electric power is supplied by a resonant circuit and a semiconductor switching element.

FIG. 2 is a circuit diagram for indicating an arrangement of the power supply apparatus 2. A magnetron drive circuit is arranged by a DC power supply 100, a high voltage transformer 102 connected to the DC power supply 100, a second capacitor 102, a first capacitor 104, a second semiconductor switching element 105, a first semiconductor switching element 106, a drive means 107, a rectifying means 108, and a magnetron 109. The second capacitor 103 is connected in series to a primary winding side of the high voltage transformer 102. The first capacitor 104 is connected in parallel to the primary winding side of this high voltage transformer 102. The second semiconductor switching element 105 is connected in parallel to the first capacitor 104. The first semiconductor switching element 106 is connected in series to the second semiconductor switching element 105. The drive means 107 drives both the first semiconductor switching element 106 and the second semiconductor switching element 105. The rectifying means 108 is connected to a secondary winding side of the high voltage transformer 102. The magnetron 109 is connected to the rectifying means 108.

With respective of the high frequency heating apparatus equipped with the oven hood, according to the present invention, with employment of the above-explained arrangement, operations and effects of this high frequency heating apparatus will now be explained.

First, in the arrangement of this first embodiment shown in FIG. 1, when a heat cooking operation is commenced, an object 13 to be heated which is located within a heating chamber 1 is heated by electromagnetic waves having a frequency of 2.45 GHz, which are radiated from a magnetron 2-1 via a waveguide 14. The object 13 to be heated is put on a heating object rotation means 9, and is rotated by an operation of a drive unit 16 of the rotation means under such a cooking condition that this object to be heated is uniformly heated. The magnetron 2-1 is cooled in a forcible air cooling manner by a cooling means 6, and a second illumination means 10 emits light via an indoor illuminating hole 17 into the heating chamber 1 in order that a progressive condition of cooking operation may be observed by a user. A control unit 12 controls the high frequency heating apparatus in such a manner that this control unit 12 judges as to whether or not the ventilation means 3 being selectively operable by the user, the first illumination means 4, and the heating object rotation means 9 are operated; and the control unit 12 supplies such a signal obtained by adding power consumption of these operations to the high frequency heating electric power to power supply apparatus in order that total power consumption as the appliance may be effectively delimited within an upper limit of the rated power consumption.

Figure 9:
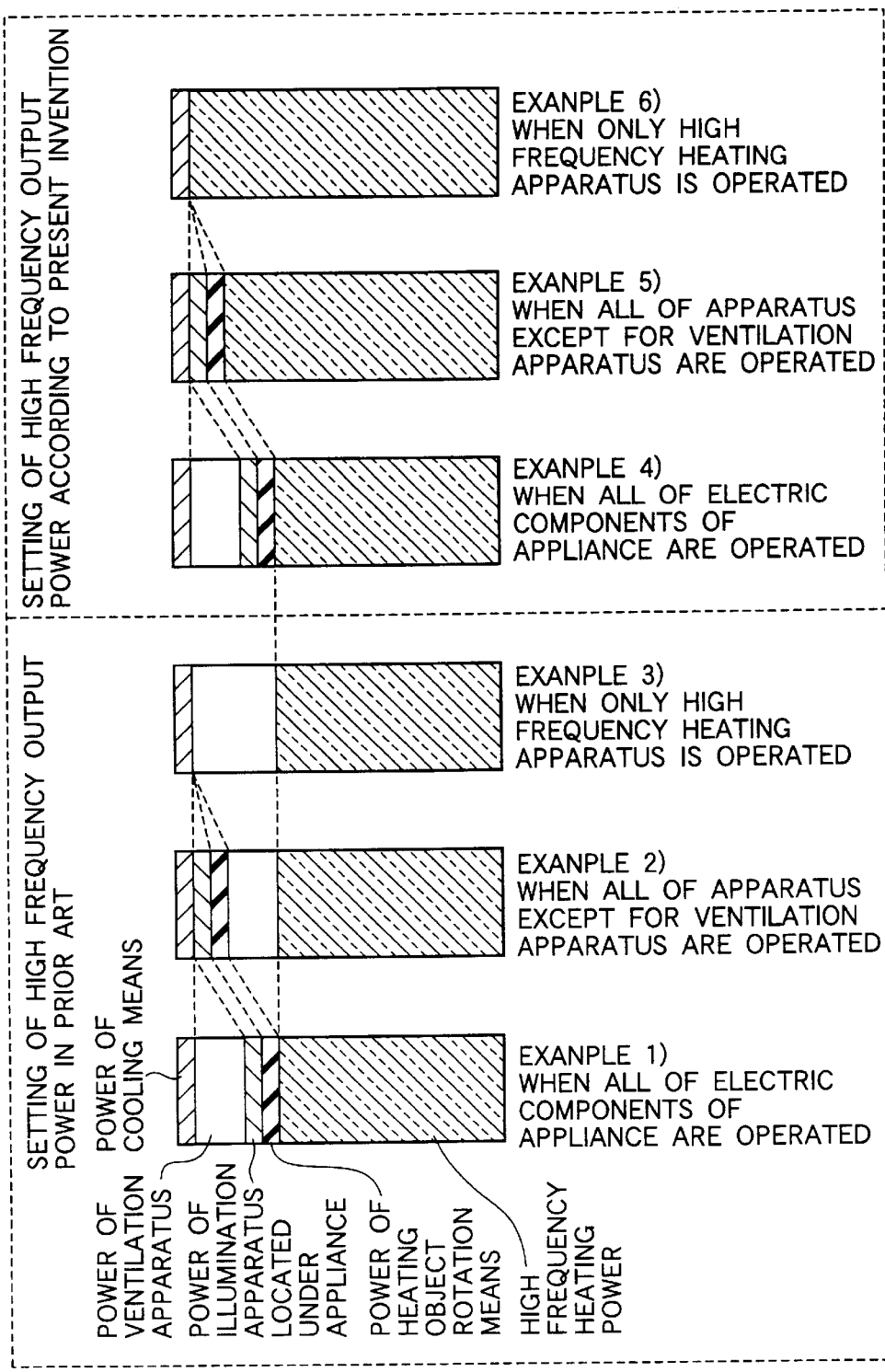
FIG. 9 is a diagram for showing the comparison between effect of prior art and that of present invention as to setting of high frequency output power.

As shown in the FIG. 9, in the case that while the electric power supply apparatus is employed as the high frequency electric power supply apparatus constructed of a semiconductor device, all of the functions such as the ventilation means, the first illumination means, and the means for rotating the object to be heated within the heating chamber, which are provided with the appliance, are operated at the same time, the maximum heating power which can be supplied from this high frequency electric power supplying apparatus is equivalent to that of the conventional appliance, as shown in the comparison examples 4, and 1 to 3 of the FIG. 9. However, as indicated in the example 5, when the ventilation apparatus which consumes high electric power is not operated, a microcomputer employed in the control unit 12 may judge the non-operation of the ventilation means, and thus, transfers to an electric power control means, such a signal which is obtained by adding the electric power consumption of this ventilation means to the high frequency heating electric power. As a result, the high frequency electric power supplying apparatus of the present invention can supply the high-frequency heating electric power higher than that of the conventional high-frequency electric power supplying apparatus. Furthermore, as, shown in the example 6, when all of the functions such as the ventilation means, the illumination means, the rotation means of the object to be heated, and the like other than the high frequency heating apparatus are not operated, similar to the explanation of the example 5, the microcomputer can add to the high frequency heating power, all of the above-described power consumption except for the power consumption of the cooling means required to cool the heating apparatus based upon the judgement result made by this microcomputer, so that the maximum high frequency electric power within a predetermined power consumption limitation can be supplied so as to heat-cook the object to be heated. As a result, the highest speed heat-cooking operation by the maximum electric power can be carried out as being permitted as possible, and the optimum cooking performance can be achieved.

Also, in this first embodiment, an element for sensing a temperature of cooling wind which cools the power supply apparatus whose self-heating amount is large is provided within the appliance, such a control operation can be carried out in such a manner that the high frequency output power is suppressed before an occurrence of a problem caused by an overheat phenomenon of the power supply apparatus. Also, it is possible to previously prevent break down phenomena of these components, firing of these components, and smoking of components, which are caused by the overheat phenomenon.

Figure 8:
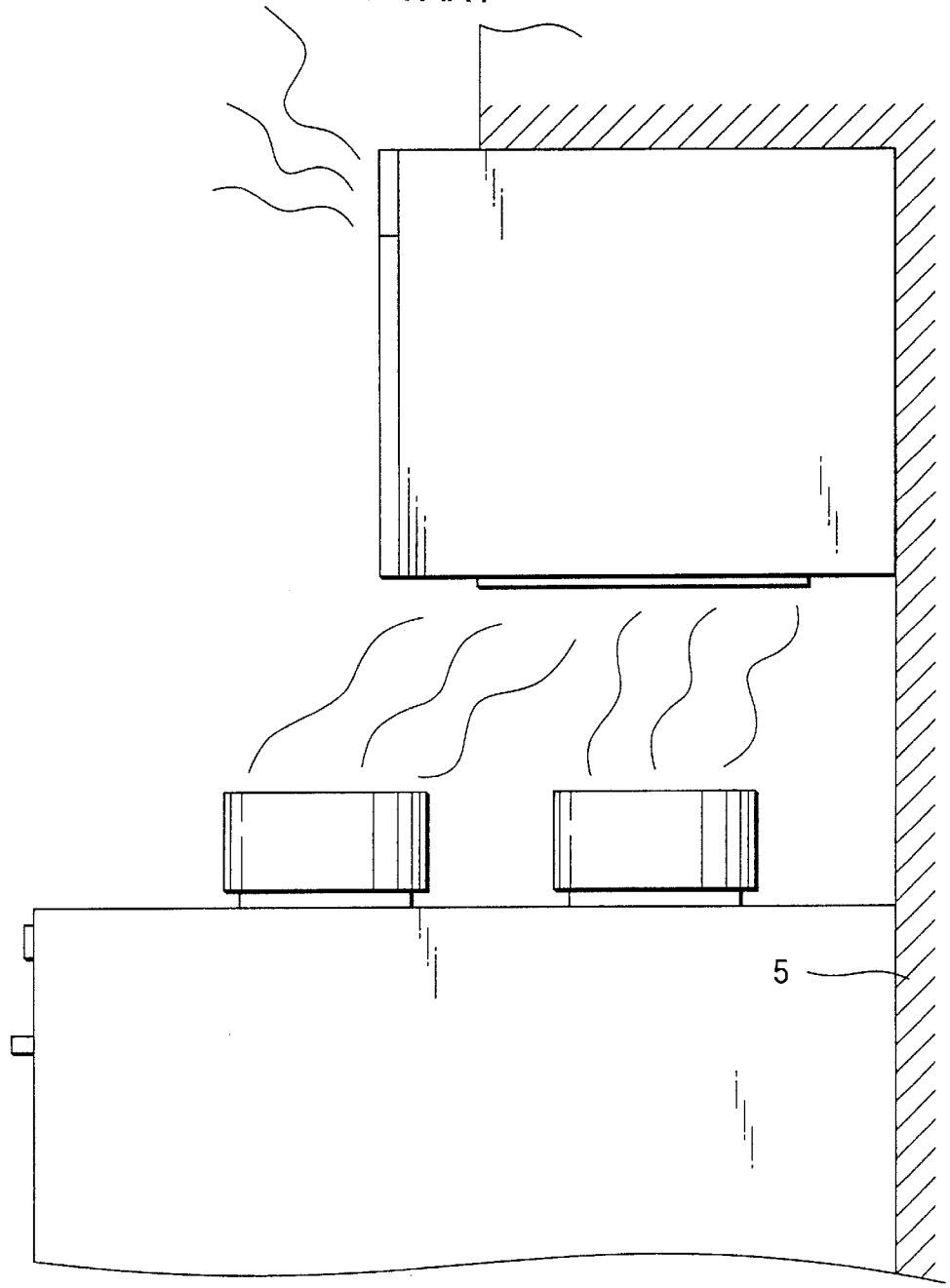
FIG. 8 shows the wall plane mounting structural diagram of the conventional high frequency heating apparatus equipped with the oven hood.

Also, in the high frequency power supply apparatus made of the semiconductor element, according to this first embodiment, the size and weight of the power supply apparatus can be made compact and can be reduced up to approximately ⅟₁₈ (namely, 550 g), as compared with that of the conventional LC resonant power supply. At the same time, since the gravity balance of the main body of the appliance can be considerably improved, as represented in FIG. 8, the high frequency power supply apparatus can be installed on a high-place mounting wall plane even by one worker. Also, since the high frequency power supply apparatus can be made in light weight and can be fixed under stable condition, great improvements in the safety setting characteristic can be realized.

(Embodiment 2)

An embodiment 2 of the present invention will now be explained with reference to FIGS. 3A, 3B, and 3C.

FIGS. 3A, 3B, and 3C are characteristic diagrams for representing a temporal change in power consumption. This drawing shows an example in which a control operation is carried out in such manner that maximum high frequency power is applied for a constant time period after heating operation is commenced. FIG. 3A shows entire power consumption (W1+W2) of a microwave oven, and this entire power consumption is constant irrespective of a time elapse. Similarly, FIG. 3B indicates electric power "W1" which is consumed so as to oscillate electromagnetic waves from the magnetron 2-1. In this characteristic diagram, during a constant time period (0 to t1) after the heating operation is commenced, power consumption is high in order to generate maximum high frequency power, but power consumption is lowered after time "t1." FIG. 3C indicates other power consumption, namely a power consumption "W2" as to a cooling fan, a lamp, a drive unit of a turn table, and the like. In this characteristic diagram, during the time period between "0" to "t1", the operations thereof are stopped so as not to consume the electric power, and conversely, after the time "t1" where the high frequency power was lowered, constant electric power is consumed in order to perform the normal operation. In this embodiment, since the time "t1" is constant, there is an effect that the control operation can be simplified.

(Embodiment 3)

Next, an embodiment 3 of the present invention will now be described with reference to FIGS. 4A, 4B, 4C, and 4D.

Figure 4A:
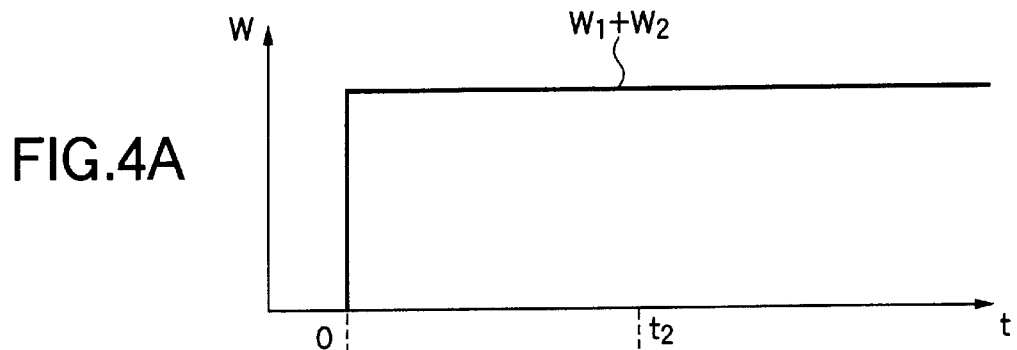
FIG. 4A is a characteristic diagram for showing entire power consumption of a high frequency heating apparatus according to an embodiment 2 of the present invention.
Figure 4B:
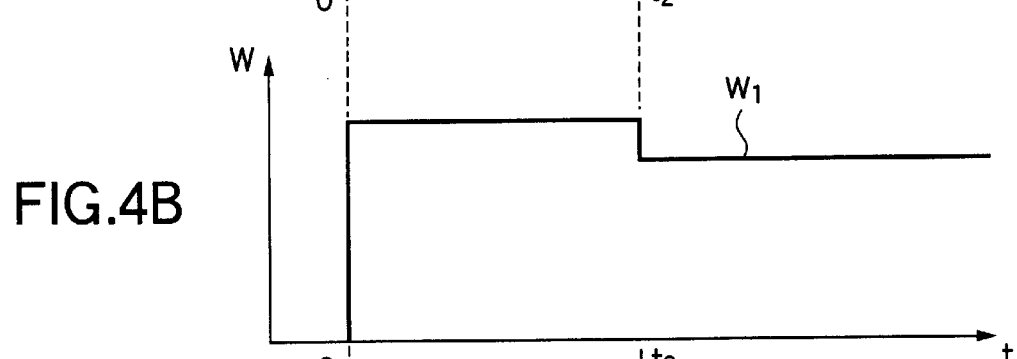
FIG. 4B is a characteristic diagram for indicating power consumption used to oscillate electromagnetic waves in the embodiment 2 of the present invention.
Figure 4C:
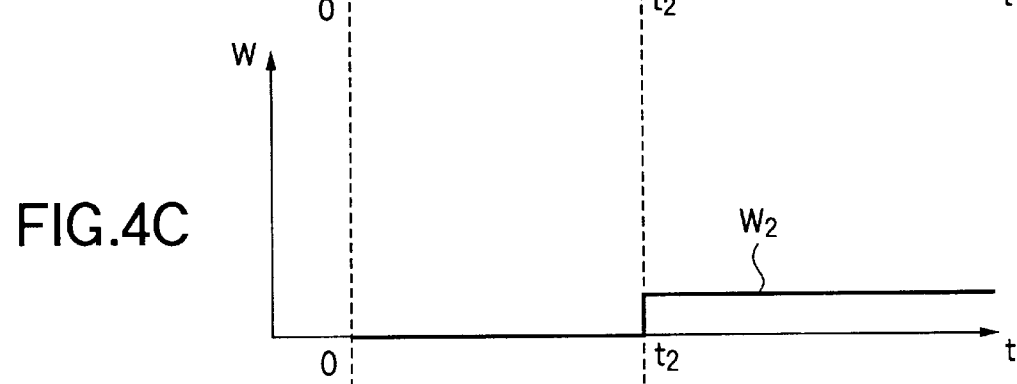
FIG. 4C is a characteristic diagram for denoting power consumption used other than the oscillation of the electromagnetic waves in the embodiment 2 of the present invention.
Figure 4D:
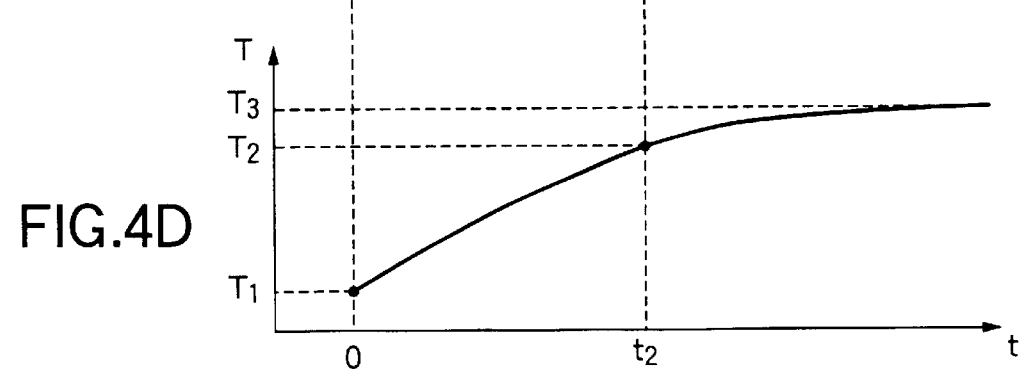
FIG. 4D is a characteristic diagram for representing a temporal change in temperatures of a magnetron in the embodiment 2 of the present invention.

FIGS. 4A, 4B, 4C, and 4D are characteristic diagrams for indicating a temporal change in power consumption in the embodiment 3 of the present invention, namely shows such a control example that maximum high frequency output power is applied when a temperature of the magnetron 2-1 is lower than, or equal to a certain temperature. FIG. 4A shows entire power consumption (W1+W2) of the microwave oven, and this entire power consumption is constant irrespective of a time elapse, similar to FIG. 3A. FIG. 4B indicates electric power "W1" which is consumed so as to oscillate electromagnetic waves from the magnetron 2-1. In this characteristic diagram, during a certain time period (0 to t2) after heating operation is commenced, power consumption is high in order to generate maximum high frequency output power, but power consumption is lowered after time "t2." FIG. 4C indicates other power consumption, namely power consumption "W2" as to the cooling fan, the lamp, the drive unit of the turn table, and the like. In this characteristic diagram, during the time period "0" to "t2", the operations are stopped so as not to consume the electric power, and conversely, after the time "t2" where the high frequency power was lowered, constant electric power is consumed in order to perform the normal operation. FIG. 4D represents a temporal change of a temperature of the magnetron 2-1. In this characteristic diagram, a temperature when a heating operation is commenced is defined as "T1", an upper limit of a temperature at which reliability can be maintained is defined as "T3", and another limit of a temperature is defined as "T2" at which if the cooling fan is subsequently actuated, then the temperature is caused to be saturated without exceeding the above-described upper temperature limit "T3." Also, time when the temperature exceeds the temperature limit "T2" is defined as "t2." While the temperatures T1, T2, T3 are changed by capturing which portion of the magnetron 2-1, when the heating operation is advanced and the heating temperature exceeds the temperature limit "T2", the high frequency power is lowered at the time "t2", and the operations of the cooling fan and the like are commenced, so that the increase of the heating temperature can be stopped. In this embodiment, there is such an effect that the high frequency power can be effectively supplied in response to reliability of the magnetron 2-1.

(Embodiment 4)

Next, an embodiment 4 of the present invention will now be described with reference to FIGS. 5A, 5B, and 5C and FIG. 6.

Figure 5A:
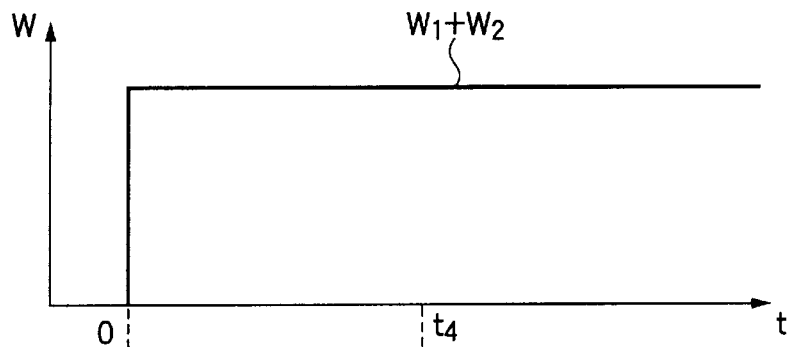
FIG. 5A is a characteristic diagram for showing entire power consumption of a high frequency heating apparatus according to an embodiment 3 of the present invention.
Figure 5B:
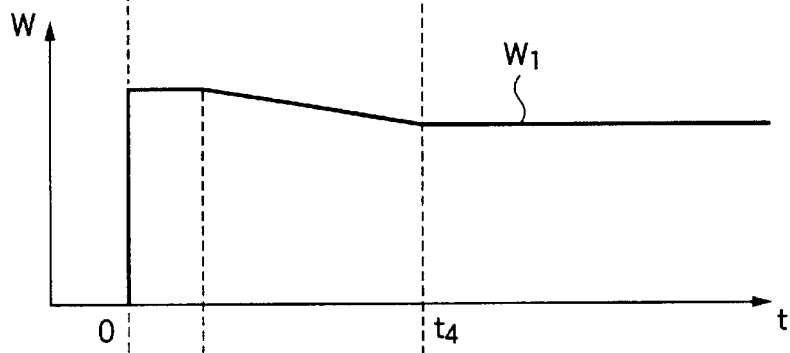
FIG. 5B is a characteristic diagram for indicating power consumption used to oscillate electromagnetic waves in the embodiment 3 of the present invention.
Figure 5C:
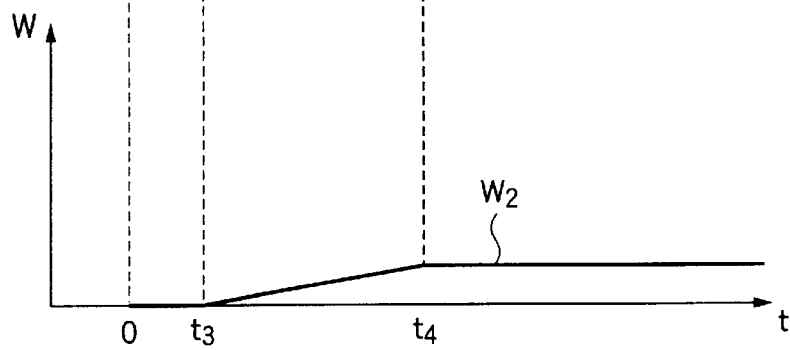
FIG. 5C is a characteristic diagram for denoting power consumption used other than the oscillation of the electromagnetic waves in the embodiment 3 of the present invention.

FIGS. 5A, 5B, and 5C are characteristic diagrams for indicating a temporal change in power consumption in the embodiment 4 of the present invention, namely shows such a control example that high frequency power is gradually decreased from a maximum value. FIG. 5A shows entire power consumption (W1+W2) of the microwave oven, and this entire power consumption is constant irrespective of a time elapse, similar to FIG. 3A and FIG. 4A. FIG. 5B indicates electric power "W1" which is consumed so as to oscillate electromagnetic waves from the magnetron 2-1. In this characteristic diagram, during a constant time period (0 to t3) after heating operation is commenced, power consumption is high in order to generate maximum high frequency output power, but power consumption is gradually lowered after time "t3", and then, becomes constant after time "t4." FIG. 5C indicates other power consumption, namely power consumption "W2" as to the cooling fan, the lamp, the drive unit of the turn table, and the like. In this characteristic diagram, during the time period "0" to "t3", the operations are stopped so as not to consume the electric power, and after the time "t3", the electric power is gradually increased. Then after the time "t4" where the high frequency power was lowered, constant electric power is consumed.

Figure 6:
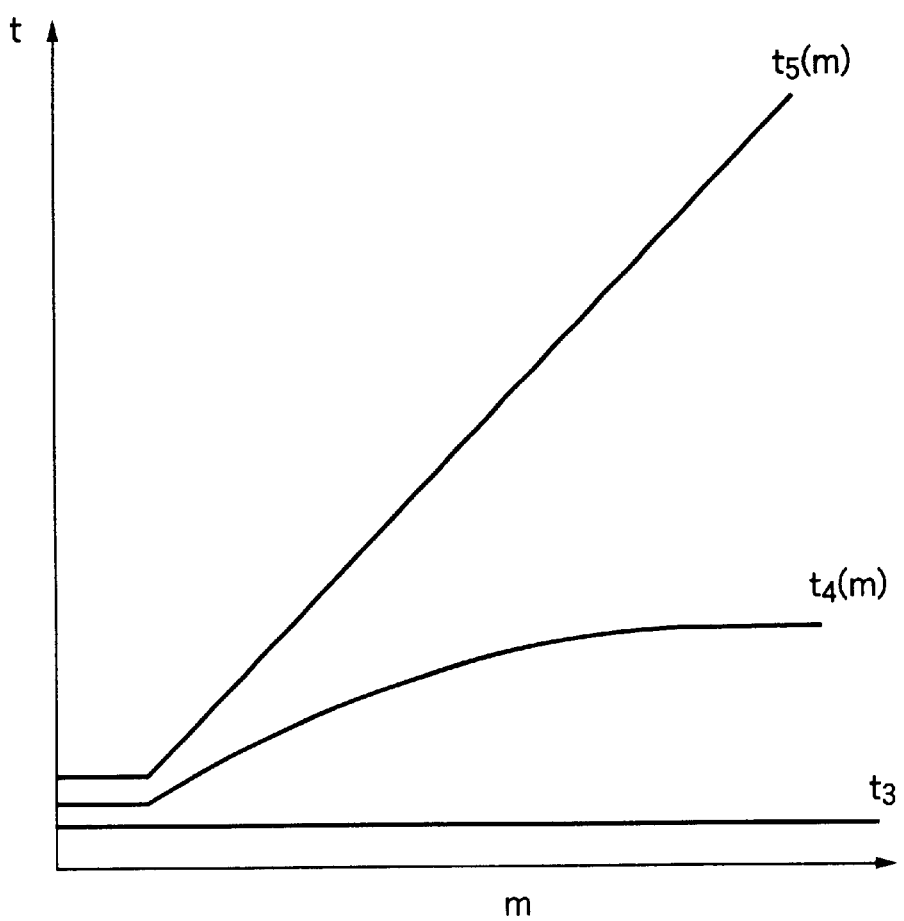
FIG. 6 is a weight-to-time characteristic diagram of the high frequency heating apparatus according to the embodiment 3 of the present invention.
Figure 7:
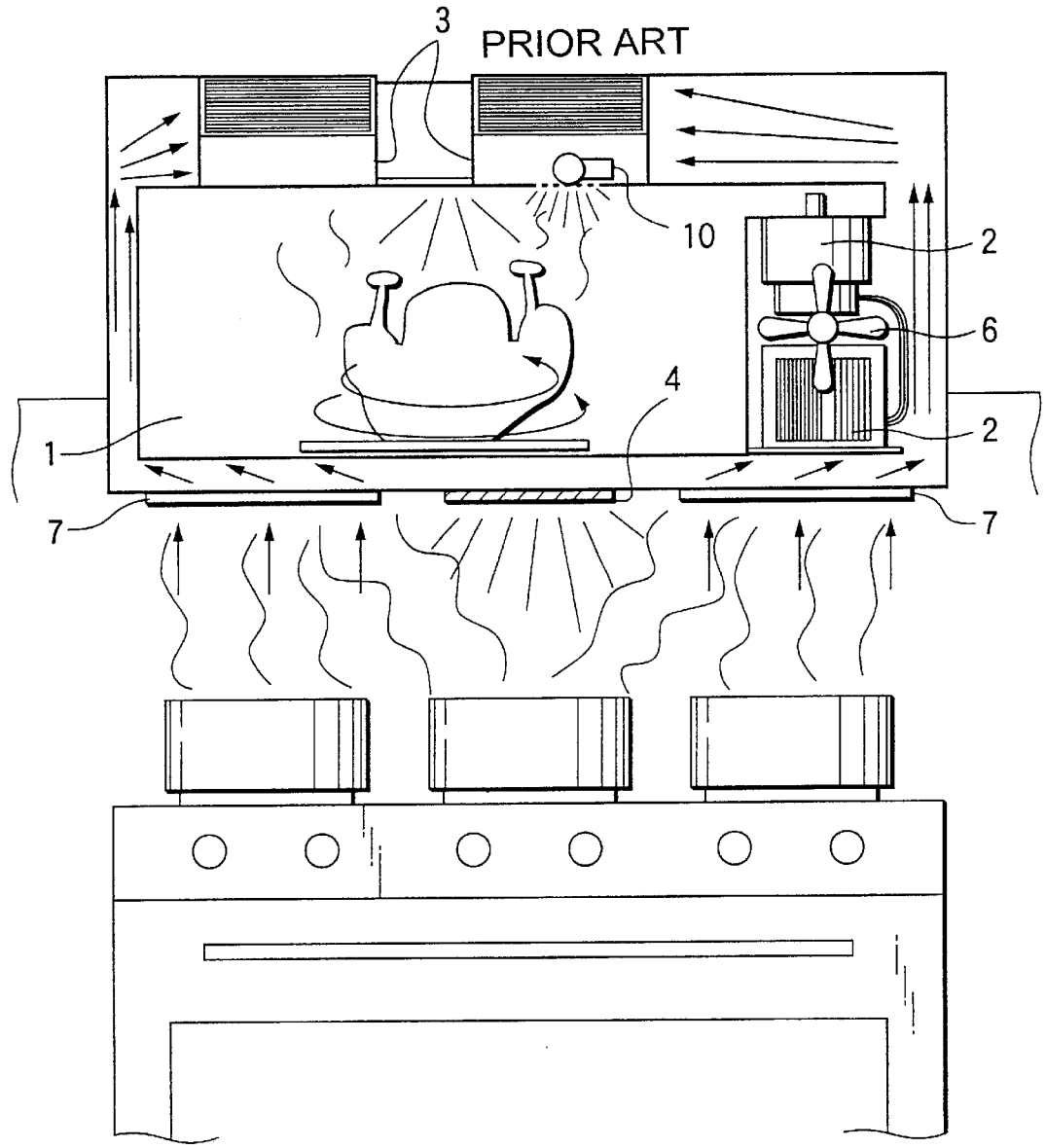
FIG. 7 is the installation diagram of the conventional high frequency heating apparatus equipped with the oven hood.

FIG. 6 represents a method of determining the time "t3" and "t4" shown in FIGS. 5A, 5B, and 5C, and an abscissa thereof indicates a food weight "m", whereas an ordinate thereof denotes time "t." While various methods for determining optimum heating time based upon information derived from the food to cook the food may be conceived, it is possible to determine optimum heating time "t5" (m) based upon a signal produced in response to the food weight "m" as shown in FIG. 1. At this time, in order that the food is uniformly cooked when cooking operation of this food is accomplished, the following limitations may be approximately determined. That is, the turn table is required to be rotated at which time stage, and also whether or not the lamp is turned ON so as to represent a progressive condition to a user. The time "t3" and "t4" are set every food weight based upon the above-explained limit time. In this embodiment, there are such effects that the cooking result when the heating operation is ended and also the confirmation of the progressive condition can be more satisfactorily given with respect to the user, and in addition, the high frequency power can be effectively supplied.

(Embodiment 5)

An embodiment 5 of the present invention will now be explained with reference to FIGS. 10, 11, 12A, 12B, and 12C.

Figure 10:
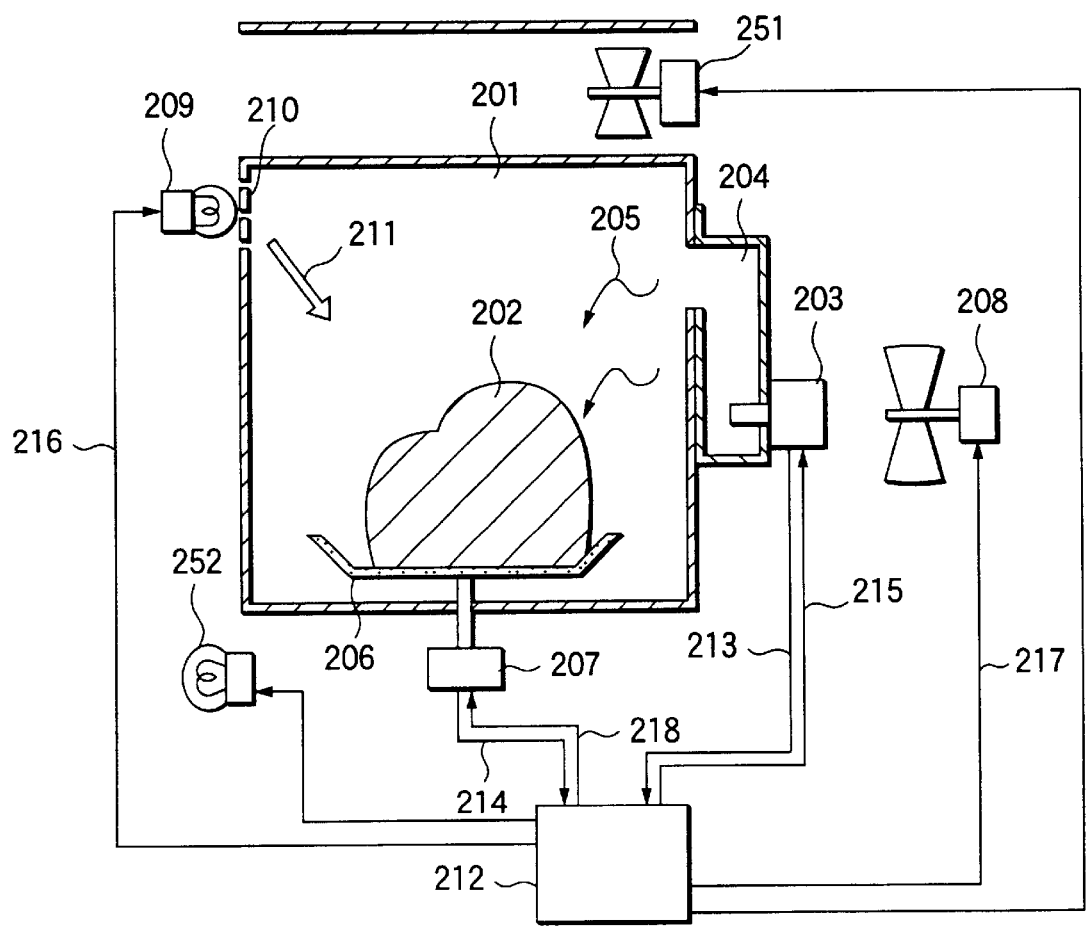
FIG. 10 is a sectional views of schematically indicating a high frequency heating apparatus equipped with an oven hood according to an embodiment 5.

FIG. 10 is a sectional view for schematically indicating a high frequency heating apparatus according to an embodiment 5 of the present invention. As shown in this drawing, food 202 provided in a heating chamber 201 is heated by electromagnetic waves 205 having a frequency of 2.45 GHz, which are radiated from a magnetron 203 via a waveguide 204. The food 202 is put on a turn table 206, and is rotated by an operation of a drive unit 207 under such a cooking condition that this food 202 is uniformly heated. The magnetron 203 is cooled in a forcible air cooling manner by a cooling fan 208, and a lamp 209 emits light 211 via a hole 210 into the heating chamber 201 in order that a progressive condition of cooking operation may be observed by a user. A control unit 212 controls the high frequency heating apparatus in such a manner that total power consumption may be effectively delimited within rated power by applying the following signals, and also receives a signal 213 produced in response to a temperature increase of the magnetron 203 and a signal produced in response to a weight of the food 202. That is, the control unit 212 applies a signal 215 for controlling an output of the magnetron 203, a signal 216 for controlling the lamp 209, a signal 217 for controlling the cooling fan 208, and also, a signal 218 for controlling the drive unit 207 of the turn table 206. A ventilation means 251 has such a structure that gas generated by a cooking operation by using another heat-cooking apparatus which is positioned under the appliance is taken into the inside of the appliance from an air suction port formed in a bottom plane portion of the appliance, and then, is exhausted via the ventilation means 251 to either a front plane of an upper portion of the appliance or to an outdoor area. Normally, the ventilation means 1 owns such a technical specification. That is, the ventilation means 251 may be independently operated irrespective of high frequency heat-cooking operation, or may be automatically operated to perform ventilation by sensing hot air, depending upon a degree of another heat-cooking operation located under this appliance.

A first illumination means 252 corresponds to an illumination means for illuminating an object to be heated, which is cooked by another heat-cooking apparatus located under the appliance. Normally, this first illumination means 252 is located at a bottom plane of the appliance.

Figure 11:
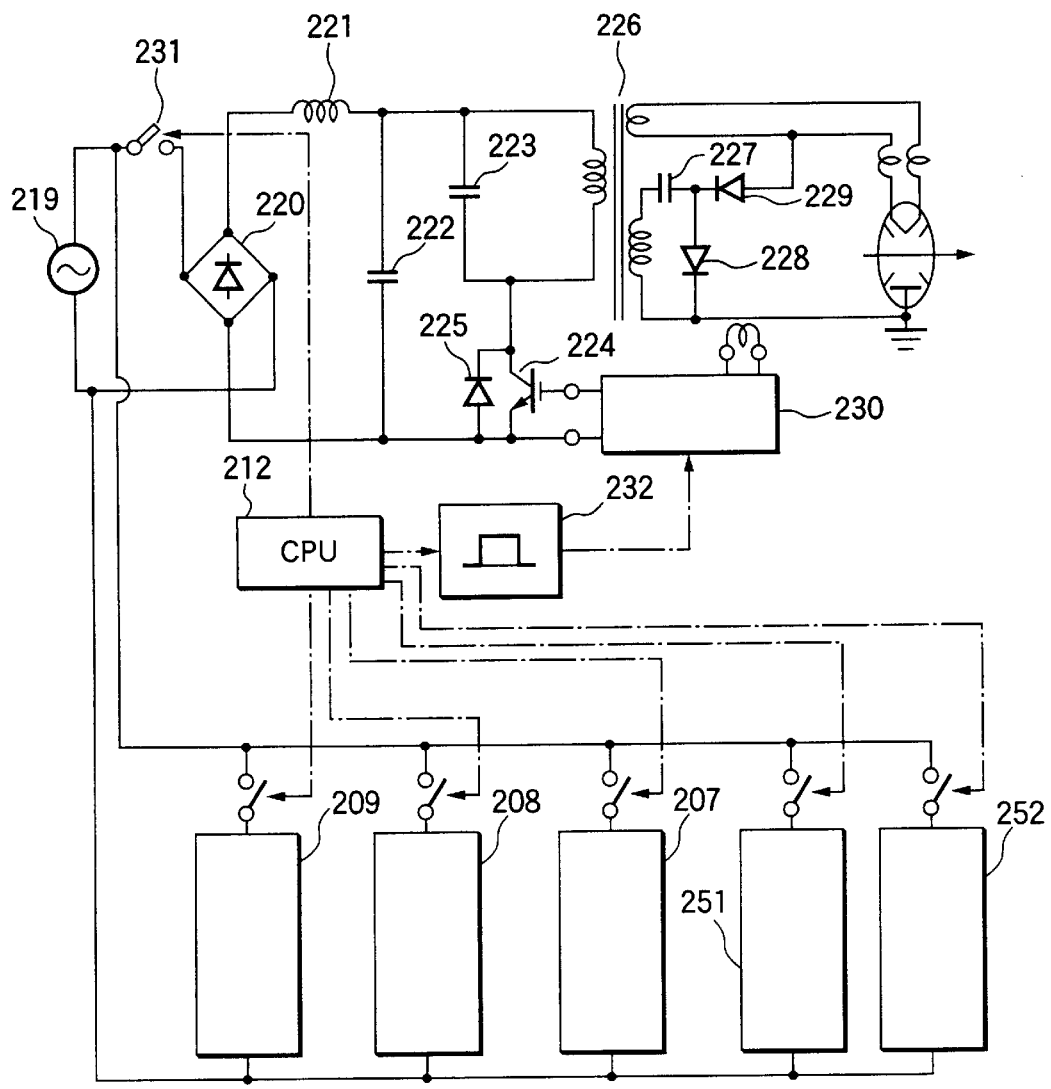
FIG. 11 is an electric circuit diagram of the high frequency heating apparatus equipped with the oven hood according to the embodiment 5 of the present invention.
Figure 13A:
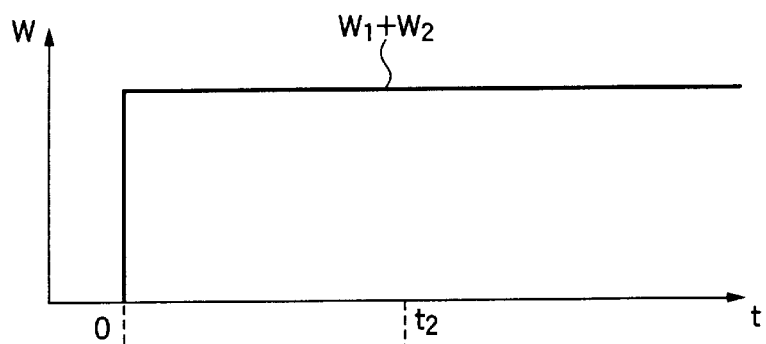
FIG. 13A is a characteristic diagram for showing entire power consumption of a high frequency heating apparatus according to an embodiment 6 of the present invention.
Figure 13B:
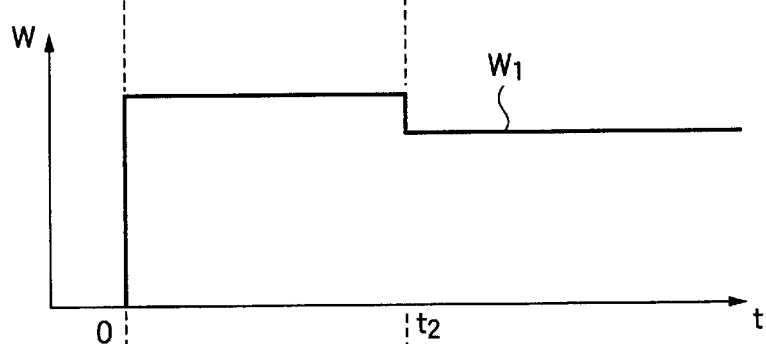
FIG. 13B is a characteristic diagram for indicating power consumption used to oscillate electromagnetic waves in the embodiment 6 of the present invention.
Figure 13C:
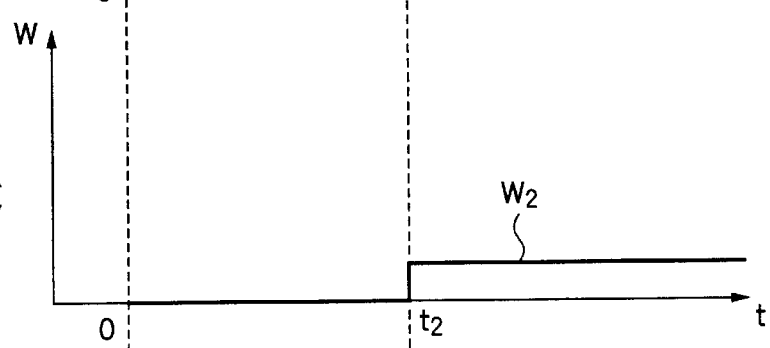
FIG. 13C is a characteristic diagram for denoting power consumption used other than the oscillation of the electromagnetic waves in the embodiment 6 of the present invention.
Figure 13D:
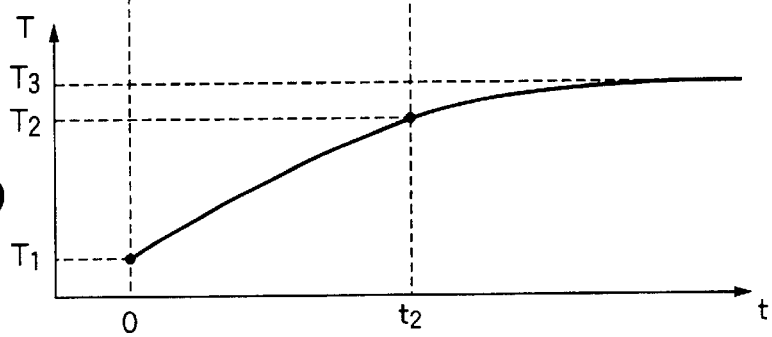
FIG. 13D is a characteristic diagram for representing a temporal change in temperatures of a magnetron in the embodiment 6 of the present invention.

FIG. 11 shows an electric circuit diagram of the high frequency heating apparatus for controlling power of the magnetron. As indicated in this drawing, the high frequency heating apparatus is constituted by a rectifying circuit, an inverter circuit, a high-voltage rectifying circuit, the magnetron 203, a control circuit 230, the control unit 212, an initiation control unit 233, and the like. The rectifying circuit is constructed of a rectifier 220, an inductor 221, and a capacitor 222, while the rectifier 220 rectifies electric power supplied from a commercial power supply 219 to obtain a DC voltage. The inverter circuit is arranged by a capacitor 223, a transistor 224, a diode 225, and a step-up transformer 226. The high-voltage rectifying circuit is constituted by a high voltage capacitor 227, a high voltage diode 228 and another high voltage diode 229. The magnetron 203 generates high frequency power by receiving the output of the high-voltage rectifying circuit. The control circuit 230 controls an operation frequency of the transistor 224. The control unit 212 controls a relay 231, and also supplies a heating instruction to this control circuit 230. The initiation control unit 232 supplies such an instruction to the high frequency heating apparatus by which maximum high frequency power can be obtained for a constant time duration when this high frequency heating apparatus is initiated. Thereafter, the control unit 212 decreases the high frequency power, and also initiates the turn table drive unit 207, the cooling fan 208, and the lamp 209.

FIGS. 12A, 12B, and 12C are characteristic diagrams for representing a temporal change in power consumption. This drawing shows an example in which a control operation is carried out in such manner that maximum high frequency power is applied for a constant time period after heating operation is commenced. FIG. 12A shows entire power consumption (W1+W2) of a microwave oven, and this entire power consumption is constant irrespective of a time elapse. Similarly, FIG. 12B indicates electric power "W1" which is consumed so as to oscillate electromagnetic waves from the magnetron 203. In this characteristic diagram, during a constant time period (0 to t1) after heating operation is commenced, power consumption is high in order to generate maximum high frequency power, but power consumption is lowered after time "t1". FIG. 12C indicates other power consumption, namely a power consumption "W2" as to the cooling fan 208, the lamp 209, the drive unit 207 of the turn table 206, and the like. In this characteristic diagram, during the time period between "0" to "t1", the operating are stopped so as not to consume the electric power, and conversely, after the time "t1" where the high frequency power was lowered, constant electric power is consumed in order to perform the normal operation. In this embodiment, since the time "t1" is constant, there is an effect that the control operation can be simplified.

As a consequence, in the case that while the electric power supply apparatus is employed as the high frequency electric power supply apparatus constructed of semiconductor devices, all of the functions such as the ventilation means, the first illumination means, and the means for rotating the object to be heated within the heating chamber, which are provided with the appliance, are operated at the same time, the maximum heating power which can be supplied from this high frequency electric power supplying apparatus is equivalent to that of the conventional appliance. However, when the ventilation apparatus which consumes high electric power is not operated, a microcomputer employed in the control unit may judge the non-operation of the ventilation means, and thus, transfers to an electric power control means, such a signal which is obtained by adding the electric power consumption of this ventilation means to the high frequency heating electric power. As a result, the high frequency electric power supplying apparatus of the present invention can supply the high-frequency heating electric power higher than that of the conventional high-frequency electric power supplying apparatus. Furthermore, when all of the functions such as the ventilation means, the illumination means, the rotation means of the object to be heated, and the like other than the high frequency heating apparatus are not operated, the microcomputer can add to the high frequency heating power, all of the above-described power consumption except for the power consumption of the cooling means required to cool the heating apparatus based upon the judgement made by this microcomputer, so that the maximum high frequency electric power within a predetermined power consumption limitation can be supplied so as to heat-cook the object to be heated. As a result, the highest speed heat-cooking operation by the maximum electric power can be carried out as being permitted as possible, and the optimum cooking performance can be achieved.

(Embodiment 6)

Next, an embodiment 6 of the present invention will now be described with reference to FIGS. 13A, 13B, 13C, and 13D. It should be understood that the same reference numerals explained in the embodiment 5 will be employed as those for denoting the same structural elements in this embodiment.

FIGS. 13A, 13B, 13C, and 13D are characteristic diagrams for indicating a temporal change in power consumption in the embodiment 6 of the present invention, namely shows such a control example that maximum high frequency output power is applied when a temperature of the magnetron 203 is lower than, or equal to a certain temperature. FIG. 4A shows entire power consumption (W1+W2) of the microwave oven, and this entire power consumption is constant irrespective of a time elapse, similar to FIG. 3A. FIG. 4B indicates electric power "W1" which is consumed so as to oscillate electromagnetic waves from the magnetron 203. In this characteristic diagram, during a certain time period (0 to t2) after heating operation is commenced, power consumption is high in order to generate maximum high frequency output power, but power consumption is lowered after time "t2". FIG. 4C indicates other power consumption, namely power consumption "W2" as to the cooling fan 208, the lamp 209, the drive unit 207 of the turn table 206, and the like. In this characteristic diagram, during the time period "0" to "t2", the operations are stopped so as not to consume the electric power, and conversely, after the time "t2" where the high frequency power was lowered, constant electric power is consumed in order to perform the normal operation. FIG. 4D represents a temporal change of a temperature of the magnetron 203. In this characteristic diagram, a temperature when a heating operation is commenced is defined as "T1", an upper limit of a temperature at which reliability can be maintained is defined as "T3", and another limit of a temperature is defined as "T2" at which if the cooling fan 208 is subsequently actuated, then the temperature is caused to be saturated without exceeding the above-described upper temperature limit "T3". Also, time when the temperature exceeds the temperature limit "T2" is defined as "t2". While the temperatures T1, T2, T3 are changed by capturing which portion of the magnetron 203, when the heating operation is advanced and the heating temperature exceeds the temperature limit "T2", the high frequency power is lowered at the time "t2", and the operations of the cooling fan 208 and the like are commenced, so that the increase of the heating temperature can be stopped. In this embodiment, there is such an effect that the high frequency power can be effectively supplied in response to reliability of the magnetron 203.

(Embodiment 7)

Next, an embodiment 7 of the present invention will now be described with reference to FIGS. 14A, 14B, and 14C and FIG. 6. It should be understood that the same reference numerals explained in the embodiment 5 will be employed as those for denoting the same structural elements in this embodiment.

Figure 14A:
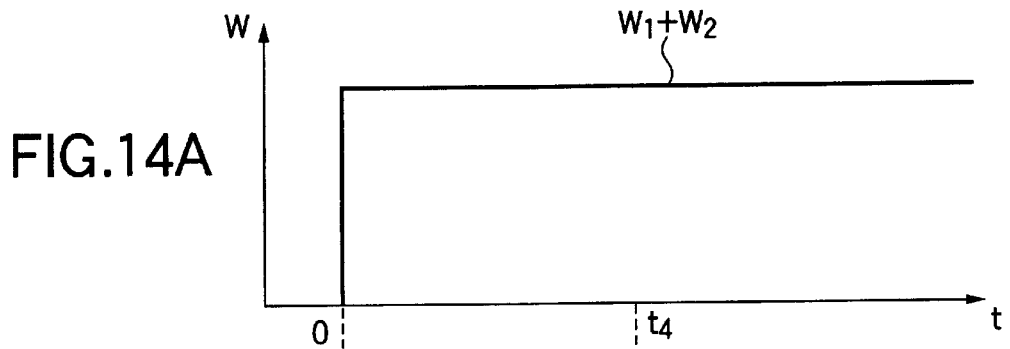
FIG. 14A is a characteristic diagram for showing entire power consumption of a high frequency heating apparatus according to an embodiment 7 of the present invention.
Figure 14B:
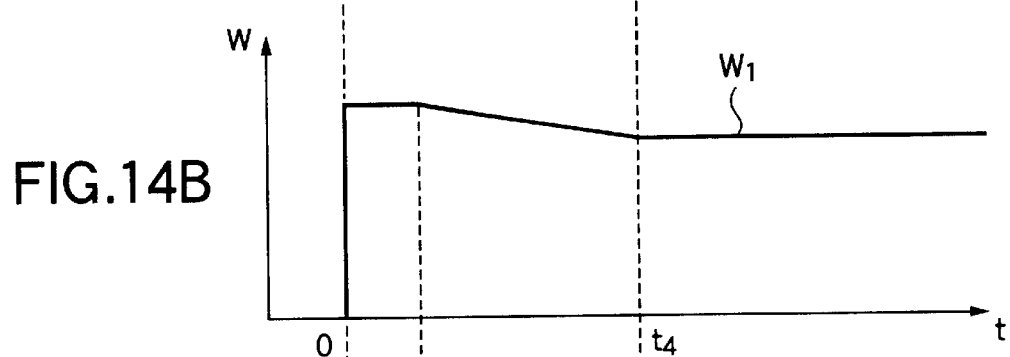
FIG. 14B is a characteristic diagram for indicating power consumption used to oscillate electromagnetic waves in the embodiment 7 of the present invention.
Figure 14C:
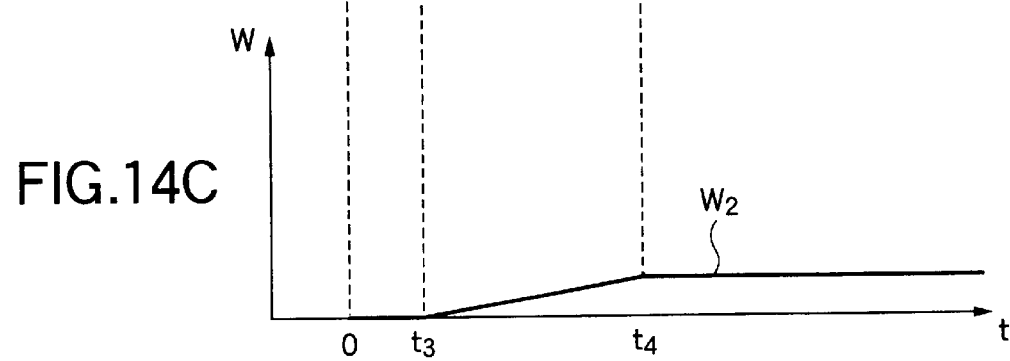
FIG. 14C is a characteristic diagram for denoting power consumption used other than the oscillation of the electromagnetic waves in the embodiment 7 of the present invention.

FIGS. 14A, 14B, and 14C are characteristic diagrams for indicating a temporal change in power consumption in the embodiment 7 of the present invention, namely shows such a control example that high frequency power is gradually decreased from a maximum value. FIG. 14A shows entire power consumption (W1+W2) of the microwave oven, and this entire power consumption is constant irrespective of a time elapse, similar to FIG. 12A and FIG. 13A. FIG. 14B indicates electric power "W1" which is consumed so as to oscillate electromagnetic waves from the magnetron 203. In this characteristic diagram, during a constant time period (0 to t3) after heating operation is commenced, power consumption is high in order to generate maximum high frequency output power, but power consumption is gradually lowered after time "t3", and then, becomes constant after time "t4". FIG. 14C indicates other power consumption, namely power consumption "W2" as to the cooling fan 208, the lamp 209, the drive unit 207 of the turn table 206, and the like. In this characteristic diagram, during the time period "0" to "t3", the operations are stopped so as not to consume the electric power, and after the time "t3", the electric power is gradually increased. Then after the time "t4" where the high frequency power was lowered, constant electric power is consumed.

Figure 15:
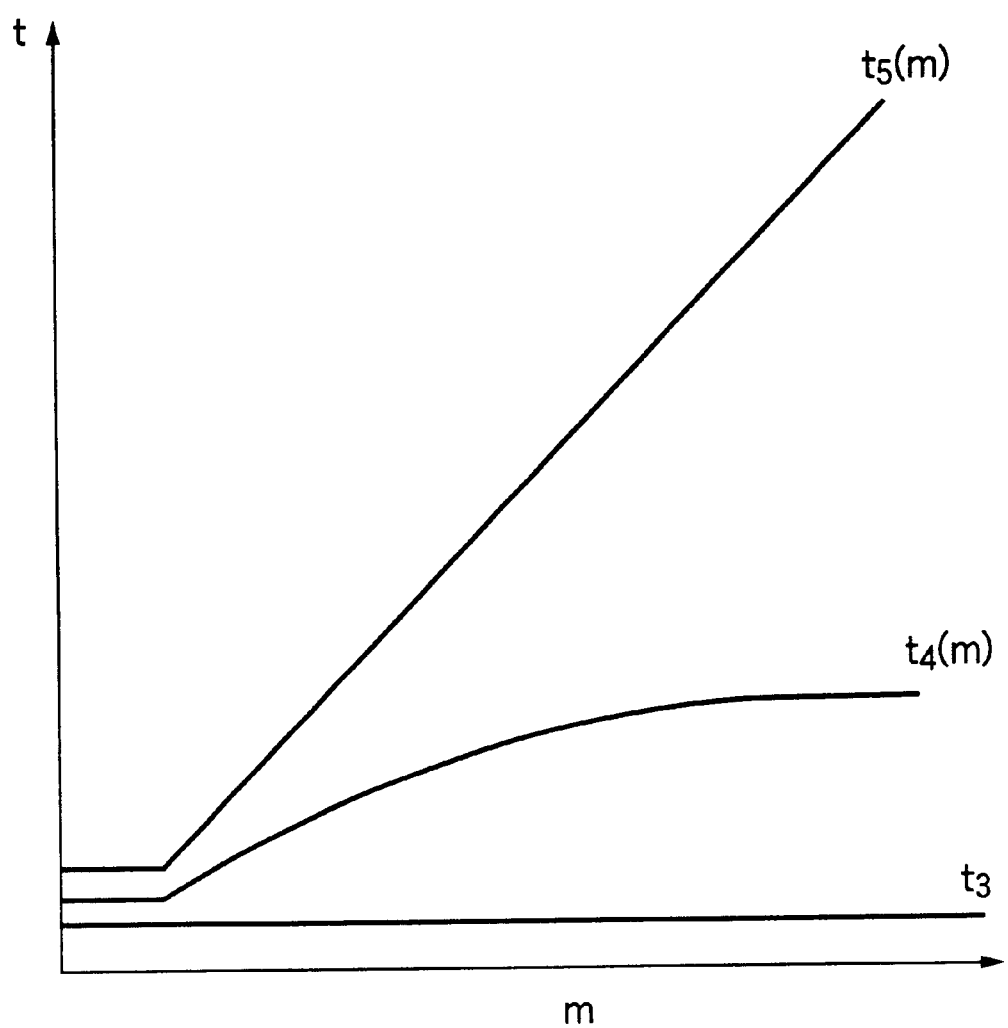
FIG. 15 is a weight-to-time characteristic diagram of the high frequency heating apparatus according to the embodiment 3 of the present invention.
Figure 16A:
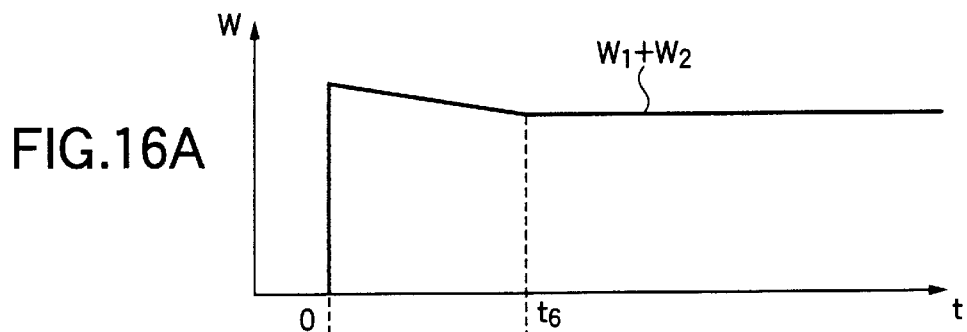
FIG. 16A is the characteristic diagram for showing the entire power consumption of the high frequency heating apparatus of the prior art.
Figure 16B:
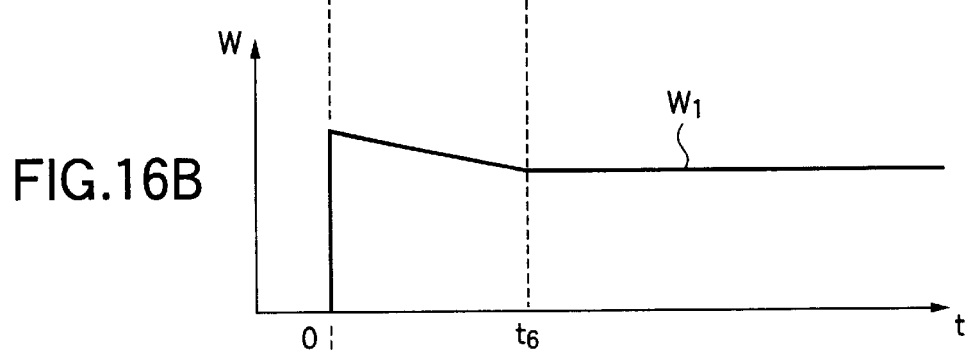
FIG. 16B is the characteristic diagram for indicating the power consumption used to oscillate the electromagnetic waves in the prior art.
Figure 16C:
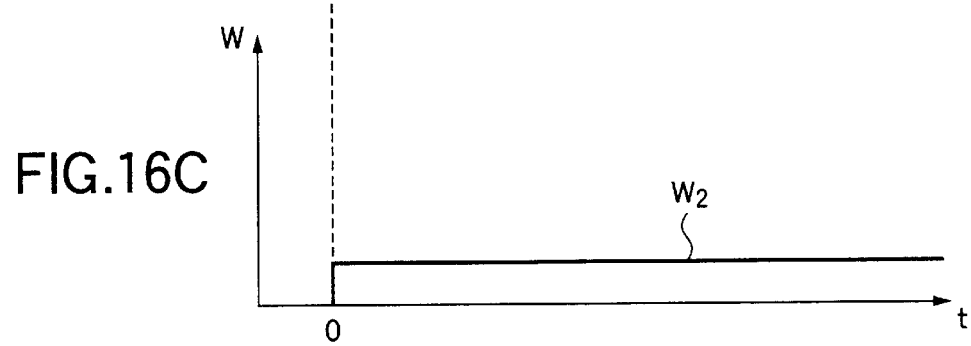
FIG. 16C is the characteristic diagram for denoting the power consumption used other than the oscillation of the electromagnetic waves in the prior art.

FIG. 15 represents a method of determining the time "t3" and "t4" shown in FIGS. 14A, 14B, and 14C, and an abscissa thereof indicates a food weight "m", whereas an ordinate thereof denotes time "t". While various methods for determining optimum heating time based upon information derived from the food 2 to cook the food 2 may be conceived, as indicated in FIG. 15, it is possible to determine optimum heating time "t5" (m) based upon a signal 214 produced in response to the food weight "m" as shown in FIG. 10. At this time, in order that the food 202 is uniformly cooked when cooking operation of this food 202 is accomplished, the following limitations may be approximately determined. That is, the turn table 206 is required to be rotated at which time stage, and also whether or not the lamp 209 is turned ON so as to represent a progressive condition to a user. The time "t3" and "t4" are set every food weight based upon the above-explained limit time. In this embodiment, there are such effects that the cooking result when the heating operation is ended and also the confirmation of the progressive condition can be more satisfactorily given with respect to the user, and in addition, the high frequency power can be effectively supplied.

What is claimed is:

1. A high frequency heating apparatus equipped with an oven hood and provided at an upper portion of another heating cooking apparatus for cooking an object to be heated, the high frequency heating apparatus comprising:

a main body of an appliance;

a heating chamber for storing the object to be heated;

heating means for cooking the object to be heated;

cooling means for cooling the heating means;

an air suction port for taking gas generated from another heat-cooking apparatus;

ventilation means for exhausting air which is taken from the air suction port;

an exhaust port for exhausting the air;

a power converter having at least one semiconductor element, for converting electric power into high frequency power so as to supply the high frequency power to the heating means; and control means for controlling the semiconductor element, wherein the high frequency heating apparatus further comprises:

initiation control means for controlling the control means in such a manner that when a heating operation is commenced, high frequency output power becomes higher than rated output power during the normal operation; and a time limiting element is provided with the initiation control means;

wherein the initiation control means controls the control means in such a manner that the high frequency output power higher than the rated output power during the normal operation is outputted only for a time period determined by the time limiting element.

2. The high frequency heating apparatus equipped with an oven hood according to claim 1, further comprising:

first illumination means for illuminating light into the heating chamber;

second illumination means for illuminating the another heat-cooking apparatus by using light, which is installed under the main body of the appliance;

rotation means for mounting thereon the object to be heated within the heating chamber so as to drive the object to be heated in a rotation motion;

heating means for heating the object to be heated;

cooling means for cooling the heating means;

ventilation means for ventilating air which is taken from an air suction port; and control means for controlling the heating means, the first and second illumination means, the rotation means, the cooling means, and the ventilation means;

wherein high frequency output power of the heating means is switched in plural output stages, and when maximum high frequency output power is outputted, any one of operations as to the first and second illumination means, the rotation means, the cooling means, and the ventilation mean is stopped, or is carried out under low power, or while any one of the first and second illumination means, the rotation means, the cooling means, and ventilation means is operated, the control means controls the power converter to reduce the high frequency output power to heating output power which is lower than the maximum high frequency output power.

3. The high frequency heating apparatus equipped with an oven hood according to claim 1 or claim 2,
wherein the high frequency heating apparatus is constituted to supply the maximum high frequency output power for a constant time period after the heating operation is commenced.

4. The high frequency heating apparatus equipped with an oven hood according to claim 1,
wherein the power converter for converting the electric power into the high frequency power comprises:
a high voltage transformer for applying a high voltage to a magnetron;
first and second capacitors connected to a primary winding side of the high voltage transformer;
a first semiconductor switching element connected to the first capacitor;
a second semiconductor switching element series-connected to the second capacitor; and
a drive circuit for driving both the first semiconductor switching element and the second semiconductor switching element;
wherein the power converter alternately drives the first semiconductor switching element and the second semiconductor switching element.

5. A high frequency heating apparatus equipped with an oven hood and provided at an upper portion of another heating cooking apparatus for cooking an object to be heated, the high frequency heating apparatus comprising:
a main body of an appliance;
a heating chamber for storing the object to be heated;
heating means for cooking the object to be heated;
cooling means for cooling the heating means;
an air suction port for taking gas generated from another heat-cooking apparatus;
ventilation means for exhausting air which is taken from the air suction port;
an exhaust port for exhausting the air;
a power converter having at least one semiconductor element, for converting electric power into high frequency power so as to supply the high frequency power to the heating means; and
control means for controlling the semiconductor element,
wherein the power converter for converting the electric power into the high frequency power comprises:
a high voltage transformer for applying a high voltage to a magnetron;
first and second capacitors connected to a primary winding side of the high voltage transformer;
a first semiconductor switching element connected to the first capacitor;
a second semiconductor switching element series-connected to the second capacitor; and a drive circuit for driving both the first semiconductor switching element and the second semiconductor switching element;
wherein the power converter alternately drives the first semiconductor switching element and the second semiconductor switching element,
wherein the high frequency heating apparatus further comprises:
initiation control means for controlling the control means in such a manner that when a heating operation is commenced, high frequency output power becomes higher than rated output power during the normal operation; and
a time limiting element is provided with the initiation control means;
wherein the initiation control means controls the control means in such a manner that the high frequency output power higher than the rated output power during the normal operation is outputted only for a time period determined by the time limiting element.

6. The high frequency heating apparatus equipped with an oven hood according to claim 5, further comprising:
first illumination means for illuminating light into the heating chamber;
second illumination means for illuminating the another heat-cooking apparatus by using light, which is installed under the main body of the appliance;
rotation means for mounting thereon the object to be heated within the heating chamber so as to drive the object to be heated in a rotation motion;
heating means for heating the object to be heated;
cooling means for cooling the heating means;
ventilation means for ventilating air which is taken from an air suction port; and
control means for controlling the heating means, the first and second illumination means, the rotation means, the cooling means, and the ventilation means;
wherein high frequency output power of the heating means is switched in plural output stages, and when maximum high frequency output power is outputted, any one of operations as to the first and second illumination means, the rotation means, the cooling means, and the ventilation mean is stopped, or is carried out under low power, or while any one of the first and second illumination means, the rotation means, the cooling means, and ventilation means is operated, the control means controls the power converter to reduce the high frequency output power to heating output power which is lower than the maximum high frequency output power.

7. The high frequency heating apparatus equipped with an oven hood according to claim 5 or claim 6,
wherein the high frequency heating apparatus is constituted to supply the maximum high frequency output power for a constant time period after the heating operation is commenced.

\* \* \* \* \*